(12) United States Patent
Slawecki

(10) Patent No.: US 6,891,421 B2
(45) Date of Patent: May 10, 2005

(54) METHOD AND APPARATUS FOR ON DIE CLOCK SHRINK BURST MODE

(75) Inventor: Darren Slawecki, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 19 days.

(21) Appl. No.: 10/320,464

(22) Filed: Dec. 17, 2002

(65) Prior Publication Data

US 2004/0113674 A1 Jun. 17, 2004

(51) Int. Cl.[7] .............................................. H03H 11/26
(52) U.S. Cl. ...................................... 327/292; 327/286
(58) Field of Search ................................ 327/292, 291, 327/298, 299, 276, 279, 286, 270, 263, 261

(56) References Cited

U.S. PATENT DOCUMENTS

| | | | | |
|---|---|---|---|---|
| 4,964,107 A | * | 10/1990 | Galbraith et al. | ............ 368/120 |
| 5,661,731 A | * | 8/1997 | Yip et al. | ................... 714/724 |
| 5,887,123 A | * | 3/1999 | Kang | ........................ 358/1.9 |
| 5,999,457 A | * | 12/1999 | Sato | ....................... 365/189.01 |
| 6,118,390 A | * | 9/2000 | Chen et al. | ................... 341/53 |
| 6,671,323 B1 | * | 12/2003 | Tahara et al. | .......... 375/240.26 |

FOREIGN PATENT DOCUMENTS

JP          58151106 A  *  9/1983  ............ H03G/3/00

* cited by examiner

Primary Examiner—Timothy P. Callahan
Assistant Examiner—Cassandra Cox
(74) Attorney, Agent, or Firm—Blakely, Sokoloff, Taylor & Zafman LLP (57) ABSTRACT

The present invention is related to method and apparatus for clock shrinking that includes a detector, a controller, a switching device, and a buffer. The detector includes one or more counters and detects activation of a trigger. The trigger starts and stops the counters. The controller generates select signals based on output from the counters. The switching device receives vectors and receives the select signals from the controller and outputs the vectors in a sequence based on the select signals. The buffer receives a clock signal and the sequence of vectors and outputs one or more shrunk clock pulses in the clock signal based on the received vectors continuously while the trigger is active. A mode selects the desired shrinking pattern for the clock pulses. The shrinking delays in time or advances in time the rising edge and/or the falling edge of the clock pulses.

26 Claims, 7 Drawing Sheets

FIG. 4 Normal Burst mode

FIG. 5 Two cycle Burst mode

METHOD AND APPARATUS FOR ON DIE CLOCK SHRINK BURST MODE

BACKGROUND

1. Field

This invention relates to clock generation, and more specifically to clock shrinking.

2. Background

Troubleshooting problems in electronic devices can be very difficult at times. This is especially true when problems occur on an intermittent or sporadic basis or are not easily repeatable. Many times these type problems relate to critical paths in a circuit that may be sensitive to the clocking scheme or clock edges during operation. Further, it may be desired to increase the operating frequency of an electronic device. In this regard, it may be desirable to increase the clock frequency in prototype devices to determine if any problems occur.

Currently, clock shrinking has been used to troubleshoot problems in electronic devices. Clock shrinking is used to shrink specific clock pulses in a clock signal and to determine if an increase in clock frequency causes potential problems. Current approaches to clock shrinking include generating a trigger to initiate the shrinking of a clock pulse. Currently, for every clock pulse to be shrunk, a corresponding trigger is required. This is useful for debug testing on a traditional tester for shrinking one clock at a time, but is ineffective in locating critical clocks on a system platform due to extremely long loops and difficulties setting and manipulating triggers.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and In other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
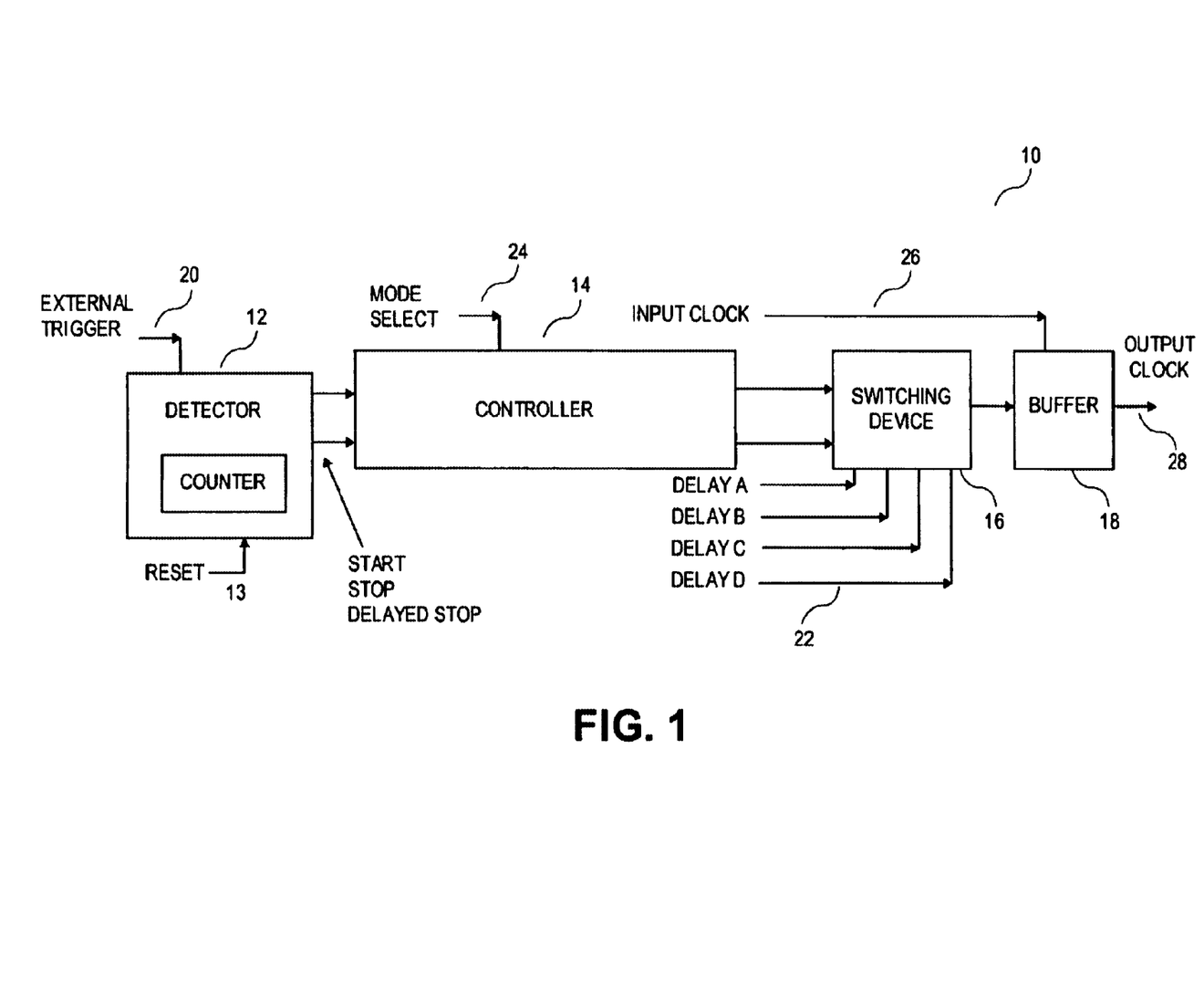
FIG. 1 is a block diagram of a circuit for clock shrinking according to an example embodiment of the present invention.

FIG. 1 shows a block diagram of a circuit for clock shrinking according to an example embodiment of the present invention. Circuit 10 includes a detector 12, a controller 14, a switching device 16, and a buffer 18. Circuit 10 may exist on-die of a microcircuit, be contained in an separate integrated circuit (IC) clock shrinking device, or be a part of other logic on a module, board, etc. Detector 12 detects the activation of an external trigger 20. External trigger 20 may be a single trigger or multiple triggers and may be used to start and stop counters in detector 12. One or more of these counters may be programmed to allow selection of a specific clock pulse in a clock signal to be shrunk.

The counters start counting upon the detection of external trigger 20. The expiration of the count programmed into the counters may cause a start signal to be generated from detector 12 and sent to controller 14. The counters may count in synchronization with a clock signal that includes the clock pulse(s) desired to be shrunk. Based on the start signal received from detector 12, controller 14 may generate select signals for switching device 16 that cause the inputs 22 to switching device 16 to be selectively sequenced through to the output of switching device 16. One input is passed to the output of switching device 16 (e.g., a multiplexer) at a time.

Inputs 22 may be positive and/or negative delay values. These values may represent a range of delays, for example, from −15 nanoseconds to +15 nanoseconds, −10 picoseconds to +10 picoseconds, etc. Each input may represent a particular positive or negative delay. The particular sequence that the inputs 22 are sequenced through to the output of switching device 16 by controller 14 may depend upon the value of a mode select signal 24. The mode select signal 24 may select between a mode where every other clock pulse may be shrunk (normal burst mode), and a mode where successive clock pulses may be shrunk (two cycle burst mode). Moreover, additional mode select lines may allow the shrinking of other variations of clock pulses in a clock signal, for example, every fourth clock pulse, every fifth clock pulse, etc.

The inputs 22 to switching device 16 may be different delay vectors. These delay vectors may be received by buffer 18 and may be converted from digital values into an analog timing between an input clock 26 received by buffer 18 and an output clock 28, that includes the shrunk clock pulse(s), produced by buffer 18. According to the present invention, as long as a trigger 20 is active, clock pulses in input clock 26 may be continuously shrunk producing output clock 28.

Moreover, the circuit in the example embodiment in FIG. 1 may be cascaded to allow for additional variations in the shrinking of clock pulses. For example, cascaded circuits may be desired in order to shrink successive clock pulses. Further, a cascaded embodiment of the present invention may be used to shrink the rising edge and the falling edge of clock pulse(s) in a clock signal.

Figure 2:
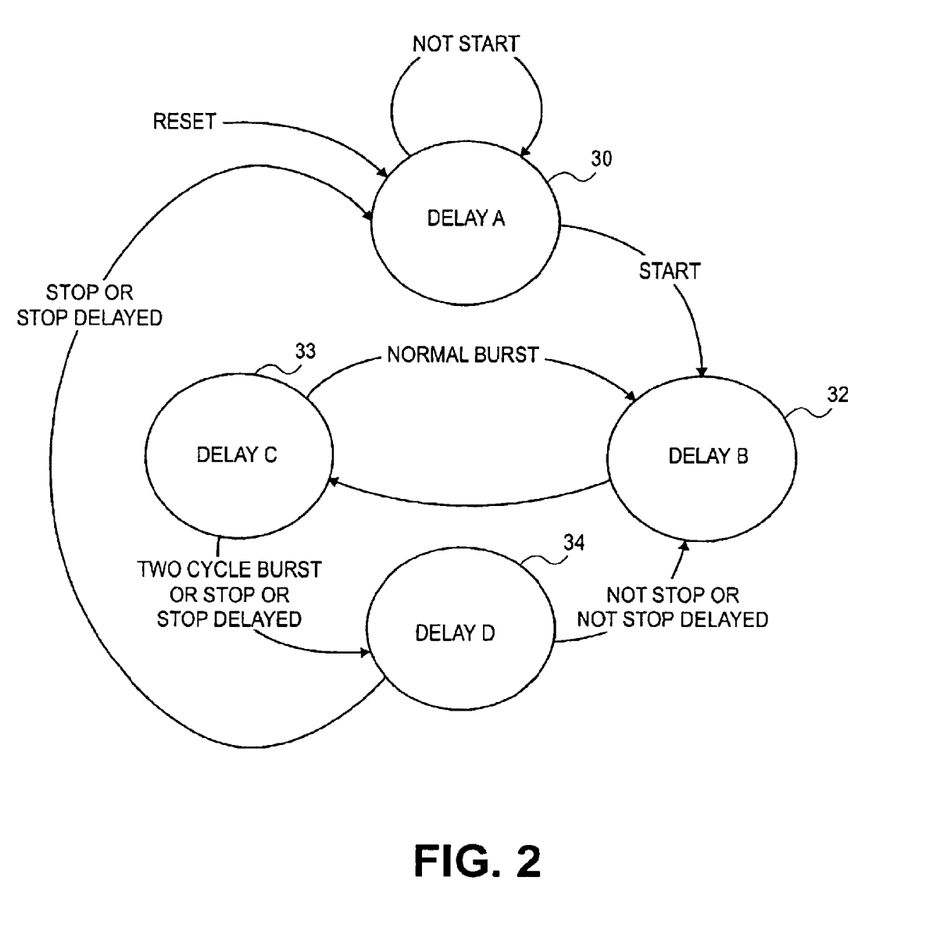
FIG. 2 is a diagram of a state machine in a controller according to an example embodiment of the present invention.

FIG. 2 shows a diagram of a state machine in a controller according to an example embodiment of the present invention. The four circles shown in FIG. 2 represent states in the state machine where select signals are generated causing a particular delay vector 22 to be passed to the output of switching device 16. Initially, if a reset signal 13 is received at circuit 10, the controller 14 may send select signals to switching device 16 to pass delay a first delay vector A to its output and on to buffer 18. This continues as long as there is no start signal received from detector 12.

Once a start signal is received, the state machine in controller 14 may change its output selects such that a second delay vector B may be passed to the output of switching device 16. The state machine may then transition such that the outputs from controller 14 cause switching device 16 to output a third delay vector C immediately following delay vector B.

If the mode select is set in a normal burst mode, controller 14 may produce output select signals causing switching device 16 to pass delay vector B and delay vector C in an alternating pattern on its outputs to buffer 18. This situation may repeat until a stop signal or delayed stop signal is received from detector 12 at controller 14. If in normal burst mode, until the trigger becomes de-activated causing the stop signal and/or delayed stop signal to be generated by the detector, the output of switching device 16 may continuously switch between outputting delay vector B and delay vector C.

If two cycle burst mode had been selected, controller 14, after sending outputs causing switching device 16 to output delay vector C, may output select signals causing switching device 16 to output a fourth delay vector D. In two cycle burst mode, controller 14 may cause the selects to switching device 16 to continuously cycle through delay vector B, delay vector C, and delay vector D until a stop signal or delayed stop signal is received from detector 12. Once a stop signal or a delay stop signal has been received, controller 14 may control the selects to switching device 16 to transition from outputting delay vector D back to outputting delay vector A. As noted previously, switching device 16 may continue to output delay vector A until another start signal is received.

Figure 3:
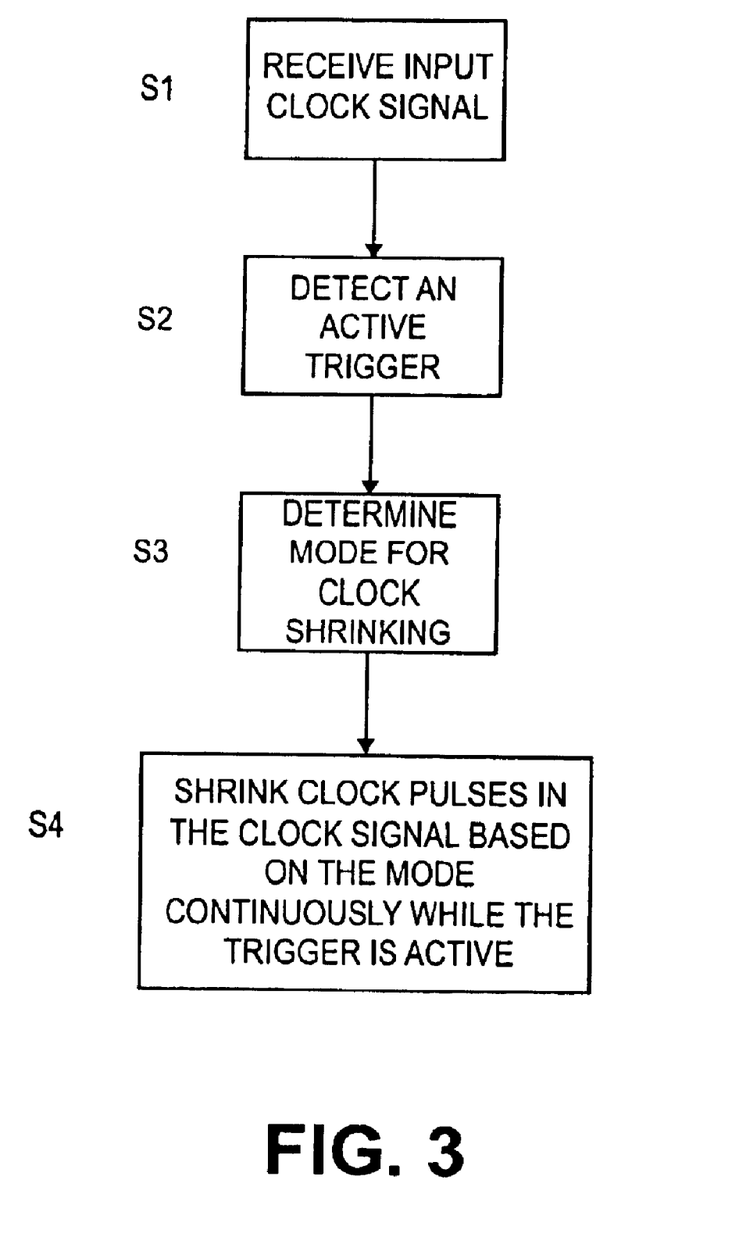
FIG. 3 is a flow chart for clock shrinking according to an example embodiment of the present invention.

FIG. 3 is a flow chart for clock shrinking according to an example embodiment of the present invention. An input clock signal is received S1. An active trigger may then be detected S2. A mode for clock shrinking is determined S3. The mode may have been set or selected well before receipt of an active trigger. One or more clock pulses in the received clock signal are shrunk based on the mode continuously while the trigger is active S4.

Figure 4:
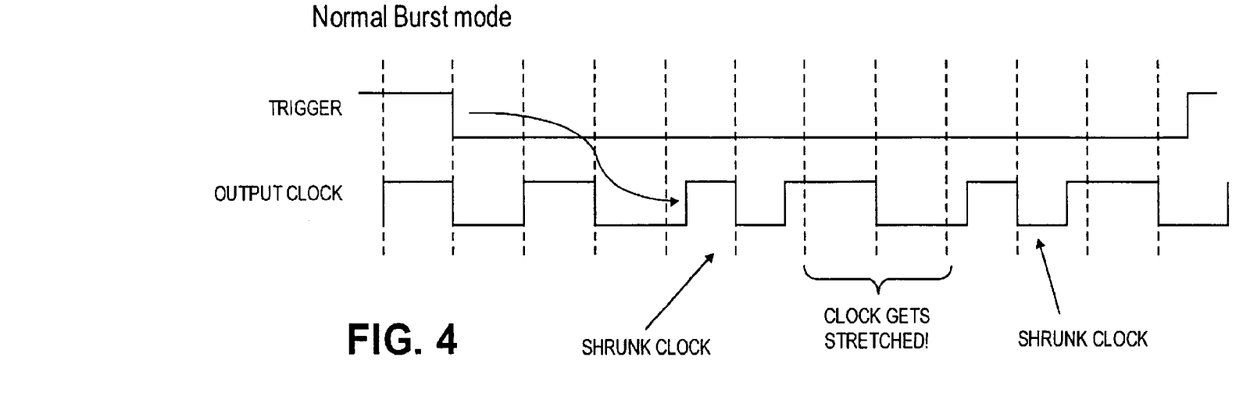
FIG. 4 is a timing diagram for burst mode clock shrinking according to an example embodiment of the present invention.

FIG. 4 shows a timing diagram for burst mode clock shrinking according to an example embodiment of the present invention. The top signal represents a trigger signal where the trigger is inactive when the signal is at a high level (logic '1') and becomes active when the signal is at a low (logic '0') level. As shown in FIG. 4, the trigger is inactive and then becomes active approximately half way through the first clock cycle and remains active for a number of successive cycles. The second signal represents an output clock signal. The vertical dashed lines in the figure represent half clock cycles. Therefore, one clock pulse starts at one dashed line, extends across a second dashed line and ends at a third dashed line. In this example embodiment, a clock pulse during the third clock period has had its rising edge shrunk in that it has been delayed over time by a value. Further, the fourth clock pulse in the clock signal has also been shrunk where the rising edge has also been delayed a similar amount. According to the present invention, when a mode signal is in the burst mode, every other clock pulse may be shrunk continuously as long as the trigger signal is active. If the mode signal was set for a two cycle burst mode, all clock edges may be independently manipulated, therefore, allowing the shrinking of two successive clock pulses continuously while the trigger signal is active.

Figure 5:
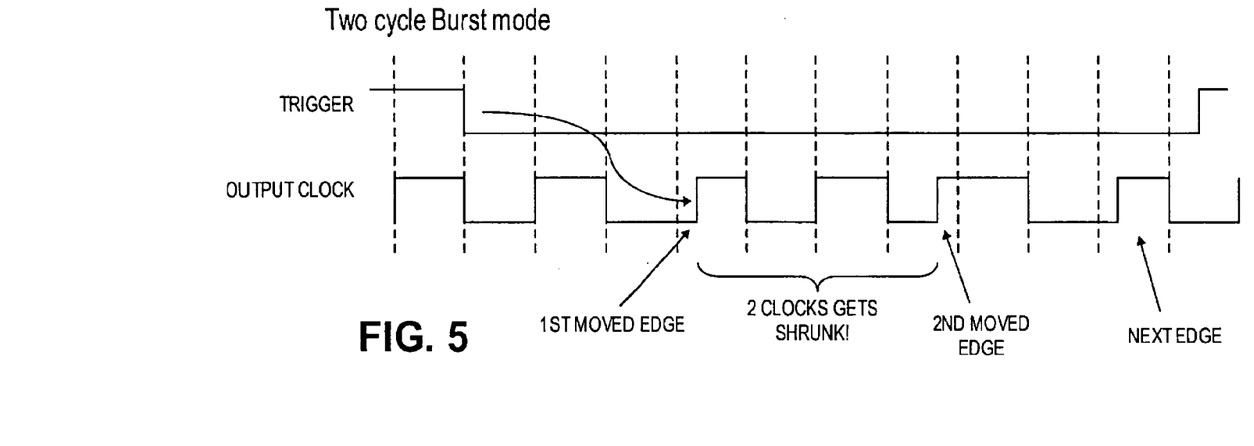
FIG. 5 is a timing diagram for two cycle burst mode clock shrinking according to an example embodiment of the present invention.

FIG. 5 shows a timing diagram for two cycle burst mode clock shrinking according to an example embodiment of the present invention. Similar to FIG. 4, the top signal represents a trigger signal where the trigger is inactive when the signal is at a high level (logic '1') and becomes active when the signal is at a low (logic '0') level. The trigger is inactive and then becomes active approximately half way through the first clock cycle and remains active for a number of successive cycles. The second signal represents an output clock signal. The vertical dashed lines in the figure represent half clock cycles. Therefore, one clock pulse starts at one dashed line, extends across a second dashed line and ends at a third dashed line.

In this example embodiment, a clock pulse during the third clock period has had its rising edge shrunk in that it has been delayed over time by a value ($1^{st}$ moved edge). Further, the fourth clock pulse in the clock signal has also been shrunk where the rising edge has been advanced ($2^{nd}$ moved edge). According to the present invention, when a mode signal is in the two cycle burst mode, all clock edges may be independently manipulated, therefore, allowing the shrinking of two successive clock pulses continuously while the trigger signal is active .

Figure 6:
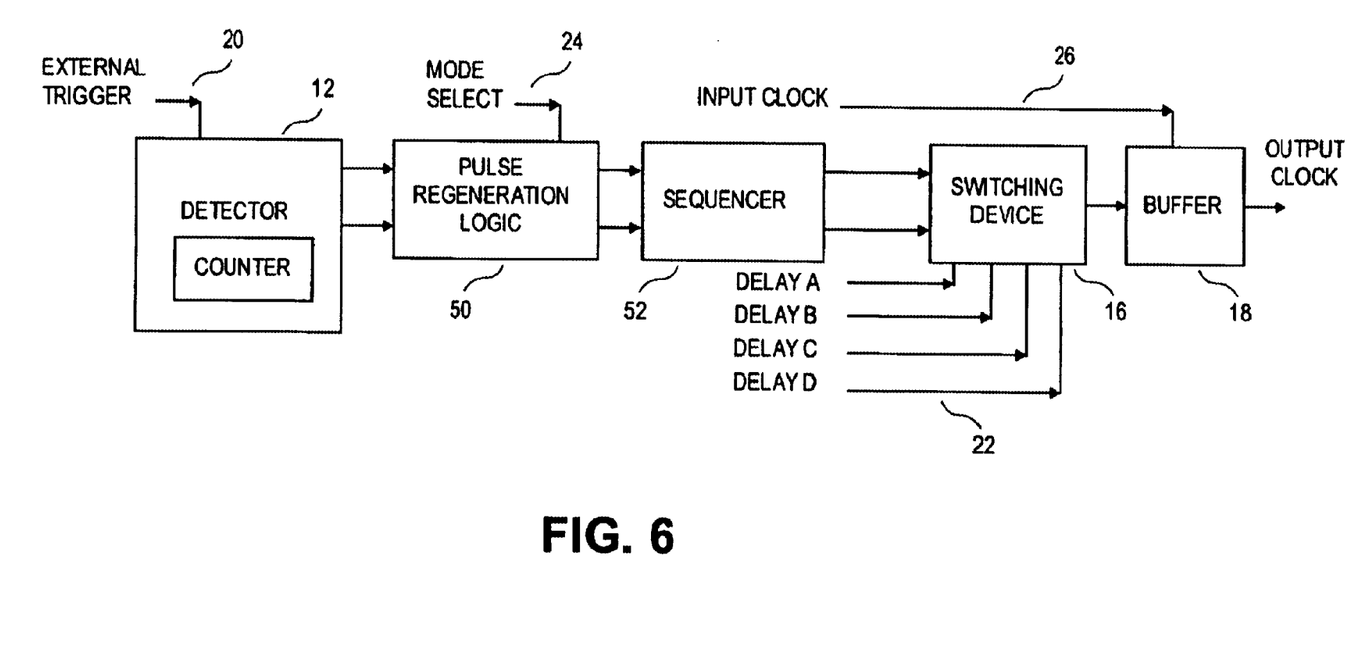
FIG. 6 is a block diagram of a circuit for clock shrinking according to a second embodiment of the present invention.

FIG. 6 shows a block diagram of a circuit for clock shrinking according to a second embodiment of the present invention. This example embodiment is similar to the embodiment shown in FIG. 1 except in this example embodiment in FIG. 6, controller 14 has been replaced with two devices, pulse regeneration logic 50 and sequencer 52. Pulse regeneration logic 50 and sequencer 52 may be a part of controller 14 shown in embodiment of FIG. 1. In the example embodiment shown in FIG. 6, pulse regeneration logic 50 may receive the start and stop signals from detector 12. Upon the receipt of a start pulse, pulse regeneration logic 50 may generate multiple pulses allowing multiple clock pulses to be shrunk. Mode select signal 24 may be received by pulse regeneration logic 50 and may determine the pulses generated by pulse regeneration logic 50. Pulse regeneration logic 50 sends control signals (i.e., multiple pulses) to sequencer 52 thereby controlling sequencer 52 to send select signals to switching device 16 causing the various delay vectors 22 to be sequenced to the output of switching device 16.

Figure 7:
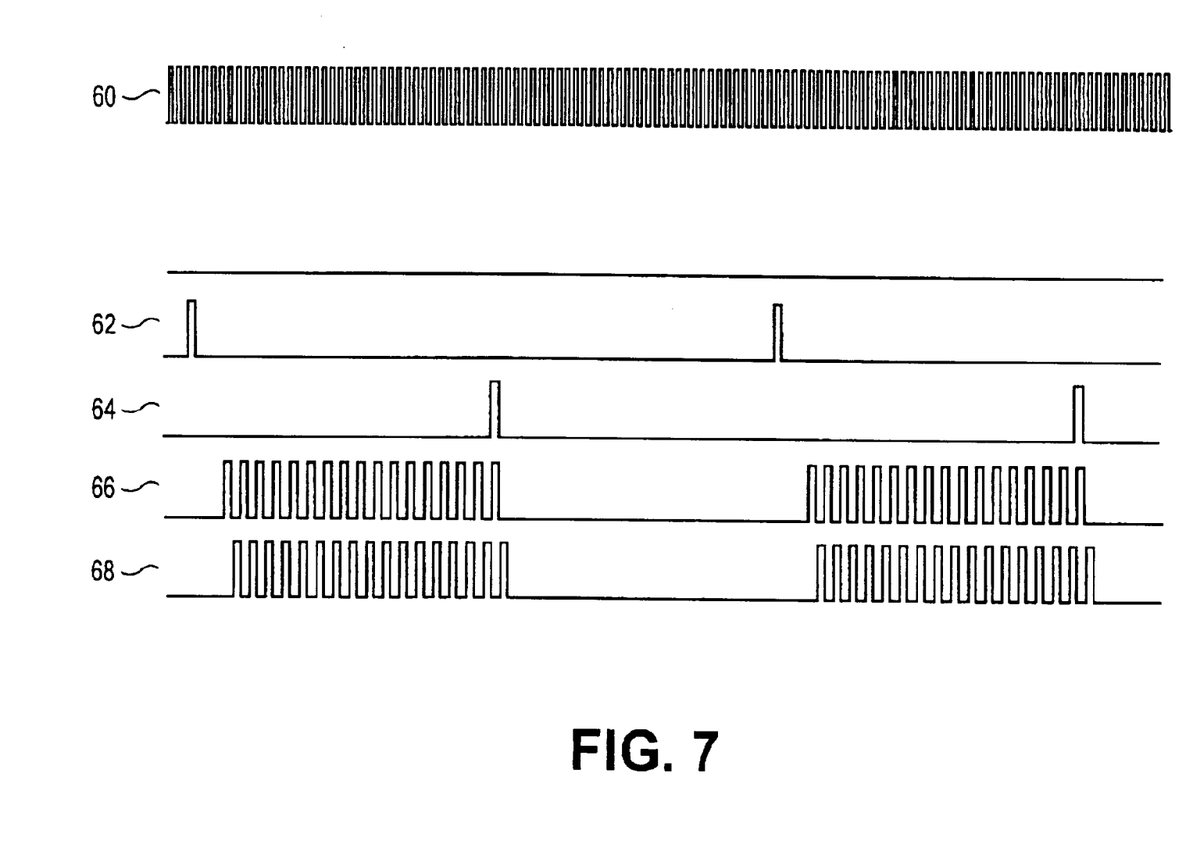
FIG. 7 is a timing diagram for the example embodiment shown in FIG. 6.

FIG. 7 shows a timing diagram for the example embodiment shown in FIG. 6. The first signal 60 represents an input clock signal. Signal 62 represents a start signal generated by a detector and sent to pulse regeneration logic 50. Signal 64 represents a stop signal generated by detector 12 and sent to pulse regeneration logic 50. The start signal may be generated upon the detection of an active trigger, and the stop signal generated upon the detection of de-activation of the trigger signal. Signals 66 and 68 represent multiple pulses generated by pulse regeneration logic 50 upon receipt of the start signal. Generation of these pulses may be terminated upon the receipt a stop signal. These pulses may be subsequently sent as control signals to sequencer 52. Since stop signal 64 may be a pulse that may not be detected by pulse regeneration logic 50, there may also be a delayed stop signal (not shown) generated by detector 12 and also sent to pulse regeneration logic 50 to insure the termination of the pulses 66 and 68. The delayed stop signal may be required to account for latency in the circuit or system.

Figure 8:
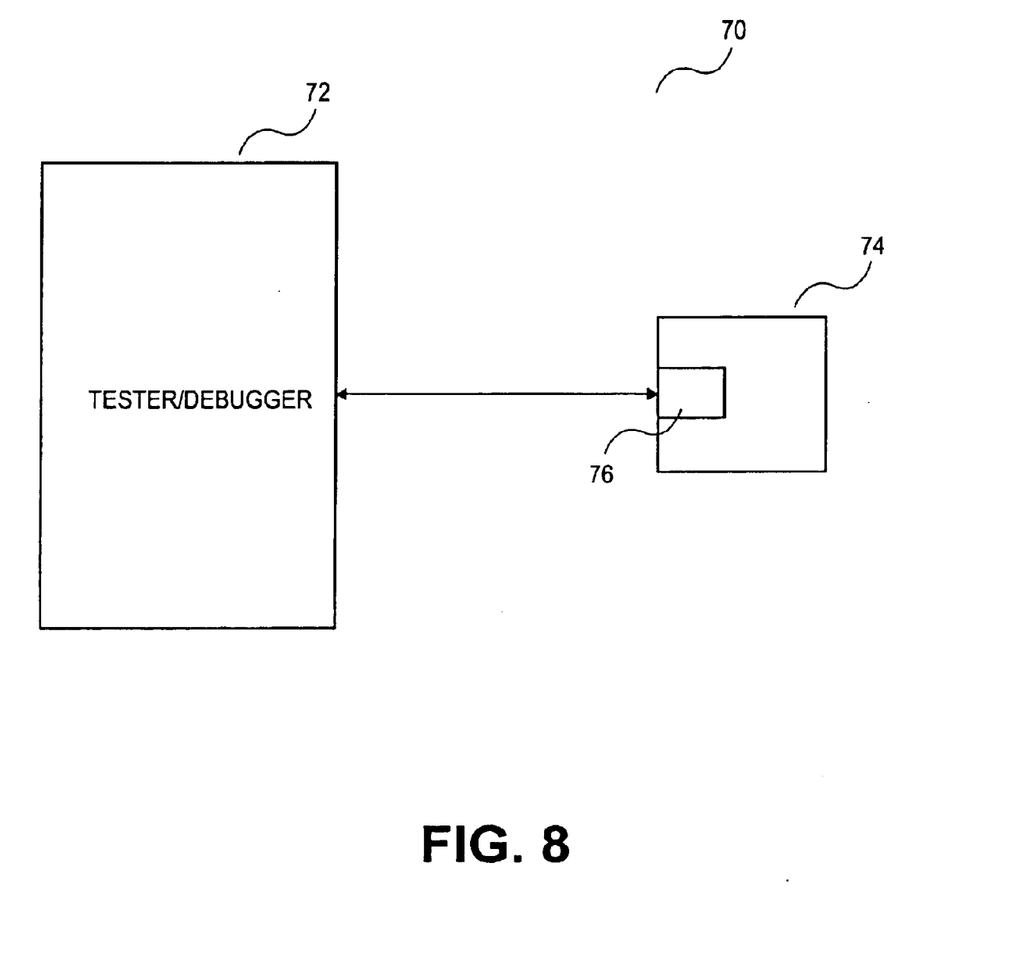
FIG. 8 is a system for clock shrinking according to an example embodiment of the present invention.

FIG. 8 shows a system for clock shrinking according to an example embodiment of the present invention. System 70 includes a tester/debugger 72 interconnected to a microcircuit 74 that includes on-die clock shrink logic 76. On-die clock shrink logic 76 may include a detector, a controller, a switching device, and a buffer. The detector detects activation of at least one trigger where the trigger if activated starts one or more counters included in the detector. The controller may generate select signals based on outputs from the counters that are sent to the switching device. The switching device may use these outputs from the controller to pass one or more delay vectors to its output in a particular sequence. The buffer may receive a clock signal and the sequence of vectors from the switching device and shrink one or more clock pulses in the clock signal producing an output clock including these shrunk clock pulses. Once a start signal is received (i.e., an active trigger detected), the clock pulse shrinking occurs continuously until a stop signal or delayed stop signal is received (i.e., until the trigger is not active).

Tester/debugger 72 initiates assertion of the trigger and may also supply the delay vectors to microcircuit 74. Tester/debugger 72 may program one or more of the counters in the detector of on-die shrink logic 74 to cause a specific clock pulse to be shrunk. Therefore, tester debugger 72 may control the shrinking of various clocks, used by microcircuit 74, by controlling the on-die clock shrink logic 76 of microcircuit 74. This allows the determination of frequency sensitive circuits or marginal timing issues inside microcircuit 74. Since specific clock pulses may be selected within a clock signal to be shrunk, isolation of potential timing problems inside microcircuit 74 may be detected. Moreover, tester/debugger 72 may also control the mode signal that determines a shrinking mode of on-die clock shrink logic 76. The mode signal may determine the pattern of the clock pulses to be shrunk (e.g., successive clock pulses, every other clock pulse, etc.) while a trigger is active. Further, multiple on-die clock shrinking logic may exist to allow shrinking successive clock pulses and/or shrinking of the falling edge of a clock pulse as well as the rising edge of a clock pulse in a clock signal.

The present invention is advantageous in that upon activation of a trigger, selected clock pulses may be shrunk continuously as opposed to current solutions where multiple clock shrinking requires multiple triggers. According to the present invention, multiple clocks may be shrunk as long as the trigger is asserted thereby allowing debug testing on traditional testers. Moreover, this allows system level testing. In this regard, for example, a clock may be shrunk for the first five minutes of a ten-minute system level test. If a failure is detected, the process may be repeated on a 2.5-minute section and so on until the critical clock causing the failure is found. In the alternative, the present invention may be used to stabilize a failure without identifying a specific clock so that additional data may be collected leading to determination of the exact failure.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A microcircuit including on-die clock shrink logic comprising:
   a detector, the detector including at least one counter and detecting activation of at least one trigger, the at least one trigger starting and stopping the at least one counter;
   a controller, the controller generating select signals based on at least one output from the at least one counter;
   a switching device, the switching device receiving vectors and receiving the select signals from the controller and outputting the vectors in a sequence based on the select signals; and
   a buffer, the buffer receiving a clock signal and the sequence of vectors and outputting at least one shrunk clock pulse in the clock signal based on the received vectors while the at least one trigger is active.

2. The microcircuit according to claim 1, the controller further comprising pulse regeneration logic and a sequencer, the controller receiving a start signal and a stop signal from the detector useable to enable and disable, respectively, the pulse regeneration logic, the sequencer receiving control signals generated by the pulse regeneration logic and generating the select signals, the sequencer sequencing the select signals through multiple values.

3. The microcircuit according to claim 1, wherein the at least one counter is programmed to select the at least one clock pulse in the clock signal to be shrunk.

4. The microcircuit according to claim 1, wherein the controller receives a mode select signal, the mode select signal causing the controller to output the select signals based on a clock shrinking mode.

5. The microcircuit according to claim 4, wherein the clock shrinking mode comprises one of a mode where every other at least one clock pulse is shrunk and a mode where successive at least one clock pulses are shrunk.

6. The microcircuit according to claim 1, wherein the buffer converts the sequence of vectors into an analog timing before outputting the shrunk clock signal.

7. The microcircuit according to claim 1, wherein the shrinking comprises at least one of delaying in time and advancing in time at least one of the rising edge and the falling edge of the at least one clock pulse.

8. The microcircuit according to claim 1, wherein each vector comprises a delay vector representing one of no delay, a positive delay and a negative delay.

9. A device including one-die clock shrink logic comprising:
- a detector, the detector including at least one counter and detecting activation of at least one trigger, the at least one trigger starting and stopping the at least one counter;
- a controller, the controller generating select signals based on at least one output from the at least one counter;
- a switching device, the switching device receiving vectors and receiving the select signals from the controller and outputting the vectors in a sequence based on the select signals; and
- a buffer, the buffer receiving a clock signal and the sequence of vectors and outputting at least one shrunk clock pulse in the clock signal based on the received vectors while the at least one trigger is active.

10. The device according to claim 9, the controller further comprising pulse regeneration logic and a sequencer, the controller receiving a start signal and a stop signal from the detector useable to enable and disable, respectively, the pulse regeneration logic, the sequencer receiving control signals generated by the pulse regeneration logic and generating the select signals, the sequencer sequencing the select signals through multiple values.

11. The device according to claim 9, wherein the at least one counter is programmed to select the at least one clock pulse in the clock signal to be shrunk.

12. The device according to claim 9, wherein the controller receives a mode select signal, the mode select signal causing the controller to output the select signals based on a clock shrinking mode.

13. The device according to claim 12, wherein the clock shrinking mode comprises one of a mode where every other at least one clock pulse is shrunk and a mode where successive at least one clock pulses are shrunk.

14. The device according to claim 9, wherein the buffer converts the sequence of vectors into an analog timing before outputting the shrunk clock signal.

15. The device according to claim 9, wherein the shrinking comprises at least one of delaying in time and advancing in time at least one of the rising edge and the falling edge of the at least one clock pulse.

16. The device according to claim 9, wherein each vector comprises a delay vector representing one of no delay, a positive delay and a negative delay.

17. A method for clock shrinking comprising:
- receiving a clock signal;
- detecting a trigger being active;
- determining a mode for clock shrinking; and
- shrinking at least one clock pulse in the clock signal based on the mode, the shrinking continuing while the trigger is active, wherein shrinking comprises at least one of delaying in time and advancing in time at least one of a rising edge and a falling edge of the at least one clock pulse; and
- receiving delay vectors that represent the at least one of delaying in time and advancing in time.

18. The method according to claim 17, further comprising not shrinking any clock pulses based on the mode.

19. The method according to claim 17, further comprising shrinking every other clock pulse based on the mode.

20. The method according to claim 17, further comprising shrinking successive clock pulses based on the mode.

21. A system for clock shrinking comprising:
- a tester device; and
- at least one microcircuit, each microcircuit including on-die clock shrink logic comprising:
  - a detector, the detector including at least one counter and detecting activation of at least one trigger, the at least one trigger starting and stopping the at least one counter;
  - a controller, the controller generating select signals based on at least one output from the at least one counter;
  - a switching device, the switching device receiving vectors and receiving the select signals from the controller and outputting the vectors in a sequence based on the select signals; and
  - a buffer, the buffer receiving a clock signal and the sequence of vectors and outputting at least one shrunk clock pulse in the clock signal based on the received vectors while the at least one trigger is active.

22. The system according to claim 21, the controller further comprising pulse regeneration logic and a sequencer, the controller receiving a start signal and a stop signal from the detector useable to enable and disable, respectively, the pulse regeneration logic, the sequencer receiving control signals generated by the pulse regeneration logic and generating the select signals, the sequencer sequencing the select signals through multiple values.

23. The system according to claim 21, wherein the at least one counter is programmed to select the at least one clock pulse in the clock signal to be shrunk.

24. The system according to claim 21, wherein the controller receives a mode select signal causing the controller to output the select signals based on a clock shrinking mode.

25. The system according to claim 24, wherein the clock shrinking mode comprises one of a mode where every other at least one clock pulse is shrunk and a mode where successive at least one clock pulses are shrunk.

26. The system according to claim 21, wherein the buffer converts the sequence of vectors into an analog timing before outputting the shrunk clock signal.

* * * * *